United States Patent [19]
Burnett et al.

[11] 3,841,403
[45] Oct. 15, 1974

[54] MISCIBLE FLOOD PROCESS FOR OIL RECOVERY USING A LEAN GAS

[75] Inventors: David B. Burnett, Houston; Robert B. Alston, Missouri, both of Tex.

[73] Assignee: Texaco Inc., New York, N.Y.

[22] Filed: June 23, 1972

[21] Appl. No.: 265,946

[52] U.S. Cl................................ 166/274, 166/273
[51] Int. Cl........................................... E21b 43/16
[58] Field of Search ............ 166/266, 274, 273, 292

[56] References Cited
UNITED STATES PATENTS

| | | | |
|---|---|---|---|
| 2,609,051 | 9/1952 | Brownscombe..................... | 166/274 |
| 2,623,596 | 12/1952 | Whorton et al..................... | 166/274 |
| 2,880,801 | 4/1959 | Crump............................... | 166/266 |
| 3,065,790 | 11/1962 | Holm.................................. | 166/274 |
| 3,084,744 | 4/1963 | Dew et al........................... | 166/274 |
| 3,157,230 | 11/1964 | Connally et al..................... | 166/274 |
| 3,223,157 | 12/1965 | Lacey et al........................ | 166/266 |

*Primary Examiner*—Henry C. Sutherland
*Assistant Examiner*—Jack E. Ebel
*Attorney, Agent, or Firm*—Thomas H. Whaley; C. G. Ries

[57] ABSTRACT

A miscible flood process for the recovery of oil from an oil-bearing reservoir in which a displacing agent such as a lean gas, capable of forming in-situ a miscible transition zone with the asphaltene-free components of the oil, is injected which miscibly displaces the asphaltene-free oil, and thereafter is followed by the injection of a driving fluid to move the previously injected displacing agent through the reservoir, thereby displacing the oil to a production well from which it is produced.

3 Claims, 1 Drawing Figure

TERNARY DIAGRAM
AT
RESERVOIR TEMPERATURE 167°F
RESERVOIR PRESSURE 2145 PSIA
FOR THE SYSTEM
Gas (G)
Reservoir Oil (R)
Basic Solvent (S)

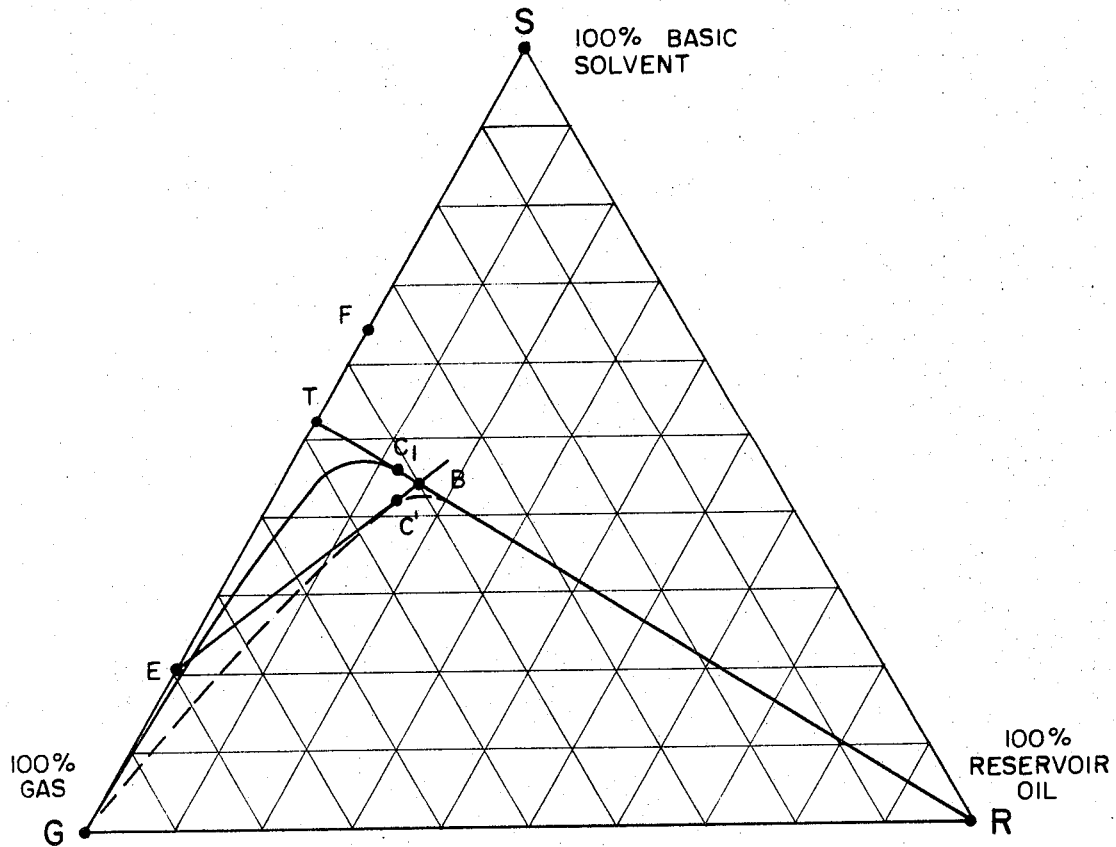
TERNARY DIAGRAM
AT
RESERVOIR TEMPERATURE 167°F
RESERVOIR PRESSURE 2145 PSIA
FOR THE SYSTEM
Gas (G)
Reservoir Oil (R)
Basic Solvent (S)

3,841,403

MISCIBLE FLOOD PROCESS FOR OIL RECOVERY USING A LEAN GAS

FIELD OF THE INVENTION

The invention relates to a proces for the recovery of oil from an underground reservoir containing oil by injecting thereinto a displacing agent such as lean gas which forms a miscible transition zone with asphaltene-free oil in-situ. Thereafter a driving fluid is injected to move the displacing agent through the reservoir thereby displacing the reservoir oil.

DESCRIPTION OF THE PRIOR ART

In the recovery of oil from an underground reservoir one method that has been suggested for improving oil recovery is that of miscible flooding wherein a solvent is injected into the reservoir to push and wash out the oil of the reservoir. When solvents are employed that can mix completely with the oil, the term "miscible flooding" is applied to the process. Miscibility exists if two fluids are capable of being mixed in any proportion without the formation of two phases.

Miscible flooding is capable of recovering essentially all contacted oil in the porous reservoir matrix. This effectiveness is derived from the fact that a two-phase system within the reservoir and between the solvent and the reservoir is eliminated at the conditions of temperature and pressure of the reservoir, thereby eliminating the retentive forces of capillarity and interfacial tension which are significant factors in reducing the recovery efficiency of oil in conventional flooding operations where the displacing agent and the reservoir oil exist as two phases in the reservoir.

One of the principal problems that occurs in the application of miscible flooding is how to best utilize the solvent injected, since the cost of the solvent may be several times the cost of the reservoir oil to be recovered.

One technique that is used employs a slug of a solvent that is capable of mixing completely with the reservoir oil, i.e., one which is miscible with the oil, and which is thereafter displaced through the reservoir by a less expensive driving agent subsequently injected.

In one development of the miscible slug process a displacing agent or solvent may be used that is not miscible upon initial contact with the reservoir oil but which becomes miscible with the reservoir oil by means of a process involving the preferential absorption by the reservoir oil of the intermediate components present in the displacing agent. The process which leads to miscibility between the displacing agent and the oil as the oil becomes richer in the intermediates is known as an enriched gas drive or condensing gas drive.

In the present invention a lean gas is used as the displacing agent, and improvement in recovery is obtained by what may be termed a condensing gas drive involving the formation of a miscible transition zone in-situ with the asphaltene-free portions of the in-place oil.

The invention has the added benefit of an attendant reduction in cost made possible by the use of a lean gas as the displacing agent.

SUMMARY OF THE INVENTION

This invention relates to a miscible flood process for the recovery of oil from oil-bearing reservoirs, wherein a displacing agent such as a lean gas is injected into the reservoir, which gas is normally immiscible with the oil, but which is capable of producing in-situ a miscible transition zone with the asphaltene-free portions of the oil and which threafter miscibly displaces the oil in the reservoir.

BRIEF DESCRIPTION OF THE FIGURE

The accompanying ternary diagram illustrates a three-component composition diagram for a complex hydrocarbon system illustrative of this invention.

DESCRIPTION OF THE INVENTION

In its broadest aspect, the process of the invention comprises first introducing into an oil-bearing reservoir a slug of a displacing agent that is normally immiscible with the reservoir fluid on initial contact. The displacing agent, which may be characterized as a lean gas solvent, is capable of forming a miscible transition zone with the asphaltene-free portions of the oil which acts as a buffer between the reservoir oil remaining and the lean solvent. This buffer zone is created in-situ and is capable of miscibly displacing the oil in the reservoir without additional asphaltene precipitation.

For purposes of this invention the term "asphaltene-free" may be defined as:

That part of the reservoir fluid in which a portion of the colloidal micelles of asphaltenes have been precipitated by treatment with a lean gas solvent. For a given crude oil, the quantity of asphalt precipitated increases with decreasing molecular weight of the solvent. These asphaltenes are non-crystalline, black solids containing high molecular weight compounds and are highly aromatic in character. The presence of these high molecular weight compounds increases the pressure requirements for vaporization of the total sample.

The invention can be demonstrated by referring to the accompanying figure. It should be pointed out that, although the depiction of a complex hydrocarbon system such as is found in an oil-bearing reservoir is somewhat arbitrary, the graphical representation as seen in the accompanying FIGURE is useful in explaining qualitatively the events that occur within the reservoir during the practice of this invention.

In the three-component composition diagram, often referred to as a ternary diagram, the three components are (G) Gas, (S) a basic solvent and (R) a reservoir oil, and are represented by the vertices of the triangle. The phase relations among the three components are depicted thereon for a given temperature and pressure. The accompanying ternary diagram illustrates the process of this invention as aplied to a reservoir wherein, for example, the reservoir temperature is 167°F. and its pressure is 2,145 psia. For this specific example, the approximate compositions of the three components are given in the following table:

MD PERCENT COMPONENTS

| Composition | (G) Gas | Basic Solvent (S) | Reservoir Oil (R) |
|---|---|---|---|
| $N_2$ | 2.4 | — | 1.6 |
| $C_1$ | 68.1 | 1.1 | 31.0 |
| $C_2$ | 20.4 | 12.0 | 9.4 |
| $C_3$ | 8.0 | 56.1 | 7.8 |
| $C_4$ | 1.0 | 30.8 | 5.8 |
| $C_5$ | 0.1 | — | 3.9 |
| $C_6^+$ | — | — | 40.5 |

The sides of the triangle represent mixtures of the components connected by the respective sides of the triangle and may be referred to as pseudo-binary mixtures. The composition of the components contained in the pseudo-binary mixtures is given by the scale along the sides of the triangle and is in mol percent. A point within the triangle represents a composition containing all three components and its composition is determined by the appropriate mol percent values at the intersection of the point. Such a composition within the triangle may be homogeneous in one phase or heterogeneous in two phases.

Referring to the FIGURE, the curve, G, $C_1$, R (the solid curve), represents the phase envelope curve. In the area within the phase envelope, two phases, viz., gas and liquid, exist, whereas compositions outside the phase envelope exist in only one phase. The area above the phase envelope generally represents mixtures of S, G, and R that are in the liquid phase, whereas the area to the left of the phase envelope represents mixtures that are in the gaseous phase.

A further concept of this invention can be shown by referring again to the accompanying FIGURE. If a displacing agent having a binary composition shown by point T is added to the reservoir oil, vertex R, the composition of the resulting admixture will lie along the line connecting T and R. Since this connecting line is tangent to the phase envelope at critical point $C_1$, it can be seen that at all times during the admixture there will be a single phase present whose composition is represented by this line and at all times there will be miscibility between the displacing agent T and the reservoir oil. Furthermore, mixtures richer in composition S, represented by points between T and vertex S, also will be miscible with the reservoir oil.

If one now considers the lower curve on the FIGURE designated by G, C', R, this curve represents the phase envelope for the conditions at equilibrium after the transition zone has become established between a lean gas displacing agent and the asphaltene-free portion of the reservoir oil. In effect, this representation after the transition zone has been established has resulted in shifting the critical point from $C_1$ to C'. This shift in the critical point further results in altering the miscibility relationships in the reservoir. From the FIGURE it can be seen that now, when a tangent is drawn to the phase envelope at the critical point, C', its intersection with line G, S will be at point E. This point now represents the minimum concentration of a solvent composition that has miscibility with the asphaltene-free portion of the reservoir. The tangent to the phase envelope in this situation has the same significance as described above.

With this discussion the essence of the invention becomes apparent, wherein a miscible flood is conducted by the injection of a displacing agent such as a lean gas solvent having a preferred composition represented by point E on the accompanying FIGURE. However, one can also see that the scope of the invention can also be met if the displacing agent or gaseous solvent contained some portion of the reservoir oil and is within the area on the accompanying FIGURE by E, T, $C_1$, B, C'. Thus, at all times during the injection of the displacing agent or gaseous solvent, a transition zone exists which is capable of forming a miscible zone with the asphaltene-free crude.

After having established the slug and the transition zone between the slug of displacing agent and the asphaltene-free reservoir oil within the reservoir, a driving fluid such as a dry gas is injected which is a gas at the reservoir conditions of pressure and temperature and is represented on the accompanying diagram as point G. The driving fluid may also be any gas having a composition within the area represented between G, E and C'. Upon injection of the driving agent, there is established a second miscible transition zone between the trailing edge of the displacing agent or lean gas and the dry gas driving agent.

The advantages of having miscible transition zones throughout the displacement process, viz., the elimination of forces of capillarity and interfacial tension that normally occur in a reservoir, would be realized thereby resulting in recovery of substantially all of the reservoir oil.

The compositions of the displacing agent or lean gas and the driving agent set forth hereinabove with respect to the practice of the invention as illustrated by the FIGURE are not limitative of this invention but merely illustrative thereof. Any suitable gaseous mixture that fulfills the conditions for establishing and maintaining requisite conditions might be employed.

The displacing agent or lean solvent employed may be any gaseous mixture of light hydrocarbons such as methane or natural gas and containing so-called intermediates such as ethane, propane, butane, pentane and hexane. The displacing agent may also be a mixture of hydrocarbons and nonhydrocarbons, such as nitrogen or carbon dioxide. Further, the displacing agent must be capable of enriching the liquid reservoir oil to the extent that the asphaltene-free portion of the oil becomes miscible with the displacing agent. The displacing agent or lean solvent is injected in amounts sufficient to establish a transition zone with the asphaltene-free portions of the oil.

The driving agent employed may be any gaseous material, that is, gaseous at reservoir conditions, and therefore miscible with the gaseous displacing agent or lean solvent. The preferred driving agent is a dry, relatively inexpensive gas, such as a gas containing substantially methane as natural gas or separator gas from a gas-processing facility. Other gases, however, which may be employed include ethane, carbon dioxide, nitrogen, air and mixtures thereof. The driving agent is injected in amounts sufficient to form a miscible transition zone with the displacing agent and also to drive the displacing agent or lean solvent through the reservoir. The driving agent is injected at a rate so that the preferred rate of movement through the reservoir is from about 0.03 to about 10.0 feet per day.

The method of invention is workable at any pressure and temperature provided the aforementioned transition zone can be established at reservoir conditions. One preferred way to determine the requisite compositions is the use of slim tube tests.

Slim tube tests are performed by employing a solvent to displace reservoir oil maintained at reservoir temperature and pressure from a long thin tube, i.e., 40 feet, packed with sand and containing the oil. Several displacements at a given temperature and pressure using solvents of varying compositions are employed to determine the optimum composition to ultimately utilize, at which the requisite miscibility is obtained.

As an example of the invention, slim tube displacements were performed in a reservoir core, at a temperature of 167°F. and 2145 psia, saturated with a recombined reservoir oil, whose composition has been listed herein and is represented on the ternary by point R. A solvent, whose composition is represented by point F on the FIGURE, miscible on first contact with oil R, was used to displace the oil and recovered 99.1 percent of the oil in place.

In a second slim tube displacement, a solvent with a composition represented by point E was used to repeat the tests and recovered 96.3 percent of the oil in place. These results indicated that a transition zone of asphaltene-free oil was created in-situ and this buffer zone miscibly displaced the rest of the in-place oil.

It is postulated that the elimination of these asphaltene components, which are the least vaporizable components in the reservoir, lowered the single phase envelope in the dew point region. Dew point is defined as the pressure at which the first droplet of liquid is formed in passing from the vapor to the two phase region.

In practice, when the single phase envelope in the dew point region is lowered by precipitation of asphaltenes, the effect upon miscibility behavior is achieved in the same fashion as though the system pressure had been increased. Thus, the lean solvent represented by point E would perform in a miscible fashion, when injected, by creating a single phase zone of asphaltene-free oil which displaces the remaining in-place oil without passing into the two phase region. This miscible behavior is achieved without an increase in pressure.

It is within the scope of the invention to apply the process either as a horizontal displacement technique wherein the slug of the displacing agent or lean solvent is established to form a circumferential ring expanding from the injection well as the process is continued, or it can be used in a vertical displacement wherein a blanket of the lean solvent is established prior to the injection of the driving agent and which moves the blanket vertically through the reservoir.

In summary, in accordance with the practice of this invention, a miscible flood is carried out in the following manner. There is introduced into the reservoir a displacing agent or lean solvent slug having a composition such that it is capable of forming with the asphaltene-free portion of the reservoir oil, at the temperature and pressure thereof, a miscible transition zone.

After an amount sufficient to establish the transition zone, there is introduced into the formation a driving agent, such as a dry gas, which is capable of forming a miscible transition zone with the displacing agent or lean solvent at the conditions of temperature and pressure of the reservoir. The injection of the driving agent is continued so as to move the fluids of the reservoir through the reservoir toward a production well from which the reservoir oil can be produced.

We claim:

1. A process for recovering oil from an oilbearing reservoir, said oil having asphaltene and nonasphaltene components, and said reservoir being traversed by at least one injection well and one production well, comprising the steps of:
   a. injecting into said reservoir via said injection well a gaseous displacing agent comprising a mixture of substantially methane and also including hydrocarbons having from 2 to 6 carbon atoms per molecule that is capable of precipitating said asphaltene components and forming a miscible transition zone with said non-asphaltene components of said oil, said gaseous displacing agent being injected in sufficient quantity to precipitate said asphaltene components and form a transition zone with said non-asphaltene components at the temperature and pressure of said reservoir,
   b. injecting into said reservoir via said injection well a driving agent that is capable of forming a miscible transition zone with said gaseous displacing agent, said driving agent being injected in sufficient quantities to form a transition zone with said gaseous displacing agent, and
   c. continuing injection of said driving agent to displace said oil toward said production well from which said oil is produced.

2. The process of claim 1 wherein said displacing agent contains nitrogen, carbon dioxide and mixtures thereof.

3. The process of claim 1 whereiin said driving agent is selected from the group consisting of methane, natural gas, separator gas, ethane, carbon dioxide, nitrogen, air and mixtures thereof.

* * * * *